(12) United States Patent
Hoch et al.

(10) Patent No.: US 10,119,624 B2
(45) Date of Patent: Nov. 6, 2018

(54) CLIP FILTER FOR HYDRAULIC VALVE AND HYDRAULIC VALVE WITH CLIP FILTER

(71) Applicant: ECO Holding 1 GmbH, Marktheidenfeld (DE)

(72) Inventors: David Hoch, Oberboihingen (DE); Christian Hugel, Wendlingen (DE); Thomas Jacob, Stuttgart (DE); Oliver Senst, Stuttgart (DE); Detlev Schack, Grafenau (DE)

(73) Assignee: ECO Holding 1 GmbH, Marktheidenfeld (DE)

( * ) Notice: Subject to any disclaimer, the term of this patent is extended or adjusted under 35 U.S.C. 154(b) by 0 days.

(21) Appl. No.: 15/442,680

(22) Filed: Feb. 26, 2017

(65) Prior Publication Data
US 2017/0356563 A1   Dec. 14, 2017

(30) Foreign Application Priority Data

Jun. 14, 2016   (DE) .................. 10 2016 110 876
Nov. 18, 2016  (DE) .................. 10 2016 122 231

(51) Int. Cl.
*F01L 1/34*      (2006.01)
*B01D 29/11*   (2006.01)
(Continued)

(52) U.S. Cl.
CPC .......... *F16K 27/041* (2013.01); *B01D 29/112* (2013.01); *B01D 35/30* (2013.01);
(Continued)

(58) Field of Classification Search
CPC .. B01D 29/112; B01D 29/055; B01D 29/072; B01D 29/114; B01D 29/115;
(Continued)

(56) References Cited

U.S. PATENT DOCUMENTS 5,102,436 A * 4/1992 Grabowski ........ B01D 46/0023
                                                                55/483
5,169,524 A * 12/1992 Meiritz .................. B01D 25/02
                                                                210/232

(Continued)

FOREIGN PATENT DOCUMENTS

DE          10027080 A1     3/2001
DE       102007050447 A1    4/2009
(Continued)

OTHER PUBLICATIONS

Machine translation of DE 102011107352 A1, pp. 1-13 (Year: 2012).*

*Primary Examiner* — David C Mellon
(74) *Attorney, Agent, or Firm* — Von Rohrscheidt Patents

(57) ABSTRACT

A clip filter for a hydraulic valve, the clip filter comprising a carrier frame; and filter elements received in the carrier frame, wherein the carrier frame is configured annular and includes a clip filter lock, wherein a first end of the carrier frame and a second end of the carrier frame are engageable with each other for closing the clip filter, wherein the first end of the carrier frame includes a lug shaped clip element and the second end of the carrier frame includes a recess that is complementary to the lug shaped clip element, and wherein a clip filter lock is configured for a maximized opening force.

11 Claims, 2 Drawing Sheets

(51) Int. Cl.
*B01D 35/30* (2006.01)
*F01L 1/344* (2006.01)
*F16H 61/00* (2006.01)
*F16K 27/04* (2006.01)
*F16K 31/06* (2006.01)
*F16K 11/078* (2006.01)

(52) U.S. Cl.
CPC ........ *F01L 1/3442* (2013.01); *F16H 61/0009* (2013.01); *F16K 11/078* (2013.01); *F16K 31/0613* (2013.01); *B01D 2201/4084* (2013.01); *B01D 2201/4092* (2013.01); *F01L 1/34* (2013.01); *F01L 2001/3443* (2013.01); *F01L 2001/3444* (2013.01); *F01L 2001/34426* (2013.01)

(58) Field of Classification Search
CPC .... B01D 2201/4084; B01D 2201/0423; B01D 2201/0415; B01D 35/30; B01D 2201/4092; F16B 3/04; F01L 2001/3444; F01L 2001/34426; F01L 2001/3443; F01L 2001/34436; F01L 2001/34433; F01L 1/34; F01L 1/3442; F16K 27/041; F16K 31/0613; F16K 11/078; F16H 61/0009
See application file for complete search history.

(56) References Cited

U.S. PATENT DOCUMENTS

| | | | | |
|---|---|---|---|---|
| 5,482,622 A * | 1/1996 | Stark | ..................... | B01D 29/111 156/245 |
| 5,599,449 A * | 2/1997 | Gnamm | ................. | B01D 29/13 210/495 |
| 5,807,483 A * | 9/1998 | Cassidy | ................. | B01D 29/15 210/232 |
| 5,820,754 A * | 10/1998 | Cassidy | ................. | B01D 29/15 210/232 |
| 7,041,217 B1 * | 5/2006 | Close | .................... | B01D 29/111 210/232 |
| 2002/0026914 A1 * | 3/2002 | Maeyama | ................. | F01L 1/34 123/90.15 |
| 2003/0006182 A1 * | 1/2003 | Gutierrez | ............... | B01D 29/15 210/232 |
| 2006/0021826 A1 * | 2/2006 | Heintzen | .............. | B01D 29/014 184/6.24 |
| 2009/0084727 A1 * | 4/2009 | Yonezawa | ............... | F16K 11/07 210/495 |
| 2011/0226204 A1 * | 9/2011 | Hoppe | ................. | B01D 29/014 123/90.17 |
| 2012/0160762 A1 * | 6/2012 | Kimura | ................ | B01D 29/112 210/432 |
| 2012/0174548 A1 * | 7/2012 | Konzelmann | ........ | B01D 29/055 55/493 |
| 2013/0199634 A1 * | 8/2013 | Hoppe | .................... | F16K 17/00 137/513.7 |

FOREIGN PATENT DOCUMENTS

| | | | | |
|---|---|---|---|---|
| DE | 102011107352 A1 * | 6/2012 | .......... | B01D 29/112 |
| DE | 102011107352 A1 | 6/2012 | | |
| EP | 2860429 A1 | 4/2015 | | |
| JP | 2007000791 A | 1/2007 | | |

* cited by examiner

CLIP FILTER FOR HYDRAULIC VALVE AND HYDRAULIC VALVE WITH CLIP FILTER

RELATED APPLICATIONS

This application claims priority from and incorporates by reference German Patent Applications DE 10 2016 110 876.6 filed on Jun. 14, 2016 and DE 10 2016 122 231.3 filed on Nov. 18, 2016.

FIELD OF THE INVENTION

The invention relates to a clip filter for a hydraulic valve and a hydraulic with the clip filter.

BACKGROUND OF THE INVENTION

Clip filters for hydraulic valves are known for example from DE 10 2007 050 447 A1 The clip filter is typically made from two typically semicircular shells which are movably connected at one end so that they are movable relative to each other and which respectively include a complementary component of a clip filter lock at another end to provide a closed ring. In order to prevent contaminants from being introduced into the hydraulic valve it has to be assured that the clip filter or the clip filter lock even under high load peaks.

Also DE 100 27 080 A1 discloses a clip filter, wherein a first end of the clip filter is configured so that it receives a second end of the clip filter only partially which facilitates a disengagement of both ends as a function of a load on the clip filter.

BRIEF SUMMARY OF THE INVENTION

It is an object of the invention to provide an improved, robust and cost effective clip filter for a hydraulic valve. Additionally a hydraulic valve with a clip filter shall be provided which is reliably protected against an introduction of contaminants and which is therefore functional in a robust and reliable manner.

The objects are achieved by a clip filter for a hydraulic valve, the clip filter comprising a carrier frame; and filter elements received in the carrier frame, wherein the carrier frame is configured annular and includes a clip filter lock, wherein a first end of the carrier frame and a second end of the carrier frame are engageable with each other for closing the clip filter, wherein the first end of the carrier frame includes a lug shaped clip element and the second end of the carrier frame includes a recess that is complementary to the lug shaped clip element, and wherein a clip filter lock is configured for a maximized opening force. Advantageous embodiments with useful and non-trivial features are disclosed in the respective dependent claims.

A clip filter according to the invention for a hydraulic valve includes a carrier frame with filter elements that are received in the carrier frame. The carrier frame is configured annular and includes a clip filter lock. Ends of the carrier frame are engageable with each other in order to close the clip filter, wherein the first end includes a lug shaped clip element and the second end includes a recess that is complementary to the clip element. According to the invention the clip filter lock is configured optimized for opening force. This means put differently that opening the clip filter lock requires high forces, whereas closing the clip filter lock is performed using much lower forces. Thus a robustness of the clip filter lock during operations is increased while providing simpler assembly compared to the prior art. The clip filter remains safely closed in particular under high individual load peaks.

In particular the recess is configured so that it envelops the lug shaped clip element in locked condition completely in the circumferential direction and in the radial direction at one end completely and at another end mostly. Put differently this means that the recess envelops the clip element almost completely. Thus the clip element can neither move in the radial direction since it is completely enveloped by the recess in the circumferential direction and the clip element cannot move in the circumferential direction since it is enveloped completely by the recess at one end along its radial extension and at the other end enveloped mostly along its radial extension.

In another embodiment the lug shaped clip element is configured wedge shaped with a bottom side and a top side that is oriented away from the bottom side and the recess is configured complementary thereto including complementary surfaces. The advantage of the wedge shaped clip element which is configured in particular tapering in the closing direction is that introduction into the recess is simplified.

In order to further increase required opening forces the clip element and the recess respectively include at least one surface portion that is configured orthogonal to the opening and closing direction. This means that the opening forces are substantially increased in particular compared to the prior art in order to overcome a wall or surface that is configured perpendicular to the opening or closing direction.

An additional safety against opening is provided by forming a bead which is configured at a surface of the recess arranged opposite to a bottom side of the clip element wherein the bottom side includes a recess that is complementary to the bead.

In another embodiment an outer arm configured at an outside of the carrier frame is configured to change position during the closing process. The recess which is configured to receive the lug shaped clip element divides the carrier frame in the portion of the recess into two outer arms wherein the recess is configured between the two outer arms. In order to reduce forces that have to be applied for closing the clip filter an outer arm oriented away from the bottom side of the clip element, thus the outer arm arranged at the outside of the carrier frame is configured flexible so that a position change of the outer arm in a radial outward direction is enabled.

In another embodiment this flexibility is implemented using a cross section contraction in the outer arm in a portion of the recess.

The flexibility to change position can also be provided by a radius which is provided at the outer arm at a side that is oriented away from the clip element. This radius can also be configured in combination with the cross section reduction which improves flexibility. Furthermore the radius can prevent the outer arm from breaking off when an excessive closing force is applied during assembly.

In order to provide a cost effective clip filter the filter elements are provided in one piece as a sheet metal band with filter openings, wherein the sheet metal band is provided integrally injection molded in the carrier frame.

The second aspect relates to a hydraulic valve with a valve bushing and a valve piston that is axially moveable in the valve bushing along a longitudinal axis of the valve bushing. The hydraulic valve includes a supply connection for feeding a hydraulic fluid, at least one operating connection and at least one tank connection for draining the hydraulic fluid. The valve piston is movable by an electromagnetic actuator of the hydraulic valve, wherein the supply connection and/or the operating connection is covered by a clip filter according to one of the preceding claims. The advantage of the invention is providing a hydraulic valve which is reliably protected against contamination due to a clip filter that is secured against opening. This leads to a service life extension of the hydraulic valve according to the invention which helps to significantly reduce warranty expenses. By the same token the hydraulic valve according to the invention is used for extending a service life of the unit including the hydraulic valve like e.g. a mechatronic transmission control or a cam phaser.

BRIEF DESCRIPTION OF THE DRAWINGS

Advantageous embodiments and advantages of the invention can be derived from the patent claims, the description and the drawing figures. The drawings, the description and the claims include plural features in combination. A person skilled in the art will advantageously view the features individually and combine them into useful additional combinations, wherein:

DETAILED DESCRIPTION OF THE INVENTION

Figure 1:
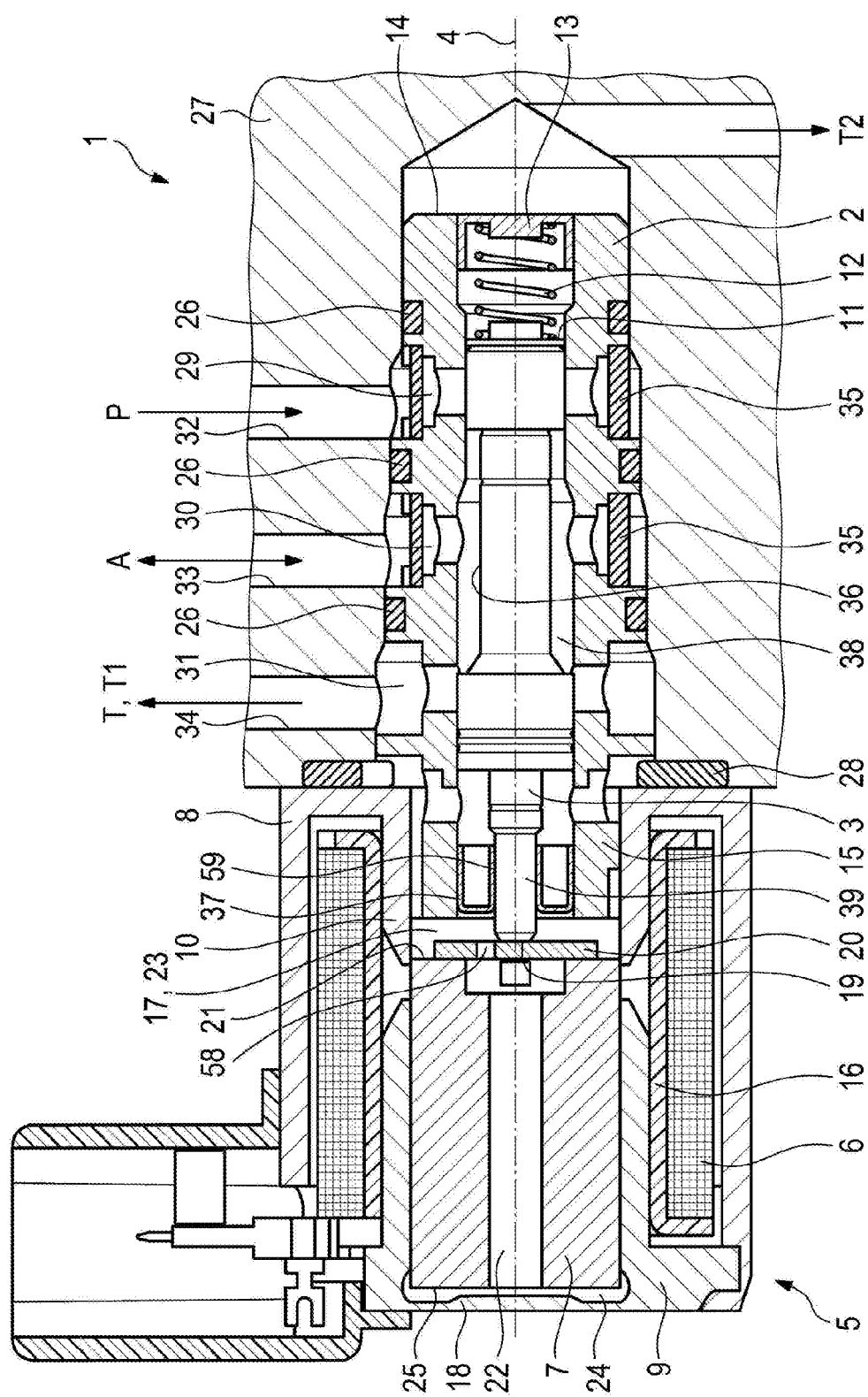
FIG. 1 illustrates a sectional view of a hydraulic valve according to an embodiment of the invention in an idle position without electrical current.

In the figures identical or like components are designated with identical reference numerals. The figures only illustrate embodiments and do not limit the scope and spirit of the invention.

FIG. 1 illustrates a longitudinal sectional view of a hydraulic valve 1 according to an embodiment of the invention. The hydraulic valve 1 configured as a proportional valve is used for example in an automatic transmission. A clip filter 35 according to the invention can be used in an exemplary manner in the subsequently described hydraulic valve 1 but also in other hydraulic valves like e.g. a cartridge valve for adjusting a cam phaser.

The hydraulic valve 1 thus includes a valve bushing 2 and a valve piston 3 that is axially moveable in a bore hole 38 provided with shoulders in the valve bushing 2 along a longitudinal axis 4 of the valve bushing 2. The valve piston 3 is movable by an electromagnetic actuator 5 of the hydraulic valve 1. The actuator 5 which embodies a magnetic portion of the hydraulic valve 1 includes an armature 7 that is operatively connected with the valve piston 3 wherein the armature 7 is arranged coaxial with the valve bushing 2. Furthermore the armature 7 is received in a housing 8 of the actuator 5 and movable by a magnet coil 6 that envelops the armature 7, wherein the armature 7 is movably arranged in a pole tube 9 and in a pole core 10.

Loading the magnet coil 6 with an electrical current axially moves the valve piston 3 wherein a retaining element 12 arranged at a face 11 of the valve piston 3 that is oriented away from the actuator 5 imparts a retaining force upon the valve piston 3 so that the valve piston 3 has to be moved against the retaining force. The retaining element 12 is configured in this embodiment as a compression coil spring and supported at cover 13 which is arranged in the valve bushing 2 with a press fit in a portion of a housing face 14 that is oriented away from the actuator 5.

The magnet coil 6 is defined by a coil carrier 16 on a radial inside and received in the housing 8 wherein the housing 8 is configured in one piece together with the pole core 10 which is arranged opposite to the pole tube 9. The cylindrical pole core 10 is oriented towards the valve bushing 2 and arranged so that it envelops and end section 10 of the valve bushing 2. The cylindrical pole tube 9 includes a wall 18 defining an armature cavity 17 at an end of the pole tube that is oriented away from the pole core 10.

The non-conductive coil carrier 16 in which a coil winding of the magnet coil 6 is received includes a U-shaped profile and is placed onto the pole tube 9 and the pole core 10. The pole tube 9 and the pole core 10 can be provided according to an embodiment illustrated in FIG. 3 in one piece and connected by a very thin connecting bar, wherein in this case the pole core 10 and the housing 8 are configured as separate components.

During operations the magnet coil 6 is excited and generates a magnetic field which magnetizes the pole core 10, the armature 7, the pole tube 9 and the housing 8. The end section 15 enveloped by the pole core 10 is also impacted by the magnetic field.

A piston plunger 39 at an end of the valve piston 3 contacts an anti-stick element 20 with a face 19 of the piston plunger oriented towards the armature 7, wherein the anti-stick element is arranged at a first face 21 of the armature 7 oriented towards the face 19. Thus, the valve piston 3 is operatively connected with the armature 7 and an axial movement of the armature 7 is transferable to the valve piston 3. The anti-stick element 20 is configured disc shaped and used for preventing adhesion of the armature 7 at the magnetically conductive valve bushing 2. Furthermore the anti-stick element 20 substantially closes a flowable armature channel 22 which is centrally arranged along the longitudinal axis 4 in the armature 7 and is configured as bore hole.

In the illustrated position of the hydraulic valve 1 an annular first cavity 23 is configured between the armature 7 and the valve bushing 2. The first cavity 23 is flow connected by at least one opening 58 introduced into the anti-stick element 20 and penetrating the anti-stick element 20 in its entirety in a direction of the longitudinal axis 4 through the armature channel 22 with an annular second space 24, wherein the second space 24 is configured between a second face 25 of the armature 7 oriented away from the first face 21 and from the wall 18 of the pole tube 9. This means that pressure balancing between the cavities 23, 24 is provided. Thus, the armature 7 only has to perform linear movement work due to the valve piston 3 when the valve piston 3 is moved in a direction that is oriented away from the actuator 5 and the armature 7 has a quick reaction time in order to adjust the valve piston 3.

The valve bushing 2 is arranged and sealed by seal elements 26, 28 for example in a transmission component 27 and includes a supply connection P for feeding the hydraulic fluid, at least one operating connection A and at least one tank drain T for draining the hydraulic. The supply connection P, the operating connection A and the tank connection T are associated in the valve bushing 2 with a first annular groove 29, a second annular groove 30 and a third annular groove 31 which are respectively connected through connection channels 32, 33, 34 with the connections of the transmission component 27. Two additional tank connections T1 and T2 are provided for leakage in the transmission component 27, wherein the tank connections T and T1 lead into a common connection channel 34 of the transmission component 27.

The supply connection P is provided for connection with an oil pump that is not illustrated in more detail so that the hydraulic valve 1 is supplyable with the hydraulic fluid which is oil in this embodiment. The first annular groove 29 and the second annular groove 30 respectively include a clip filter 35 for filtering the hydraulic fluid.

The valve piston 3 includes a circumferential ring groove 36. Depending on a positioning of the valve piston 3 either the operating connection A is flow connected with the tank connection T as illustrated or the supply connection P is flow connected with the operating connection A.

A seal element 37 configured as a disc with a U-shaped cross section, for example a deep drawn disc, is used for a spatial separation of the magnet component and the hydraulic component 1 and is arranged in the end section 15 of the valve bushing 2. Advantageously the seal element 37 is pressed into the bore hole 38.

It is evident that the piston plunger 39 penetrates an inner arm 59 of the seal element 57 without contact so that a gap provided between the piston plunger 39 and the arm 59 functions as a seal gap and thus as a gap seal, wherein an exchange of the hydraulic fluid can be reduced to a minimum by choosing a ratio of seal length to gap height of the seal gap.

Thus, an exchange of contaminant particles which impair the magnetic and/or hydraulic functions can be significantly reduced between the magnet portion and the hydraulic portion of the hydraulic valve 1. In particular a negative influence upon armature movement in the pole tube 9 and thus induced magnet valve hysteresis can be prevented.

Figure 2:
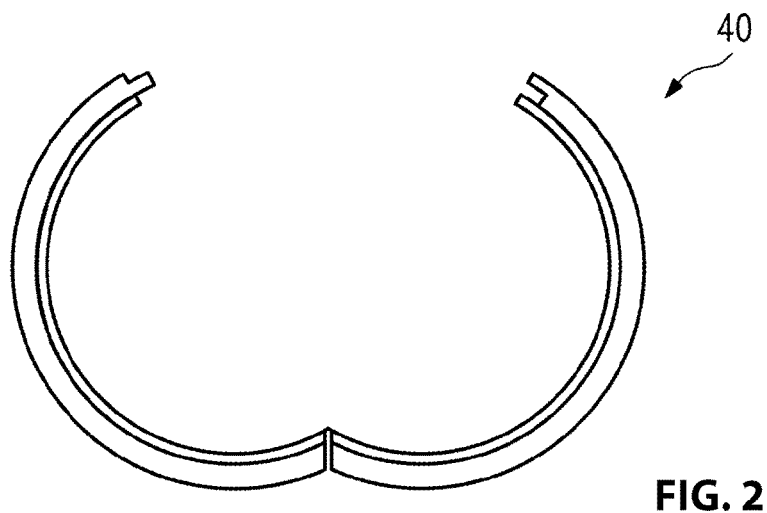
FIG. 2 illustrates an open clip filter that is known in the art.

In order to secure the hydraulic valve 1 and the entire hydraulic portion of the mechatronics against contamination the annular clip filters 35 cover the connections P and A. Out of the box the clip filters 35 are open at one location of the circumference so that they can be mounted. FIG. 2 illustrates a known clip filter 40 in an open condition. It is a disadvantage of the known clip filter 40 that they open unintentionally for example due to high flow forces during a first filling of the hydraulic valve 1 so that the function of the clip filter 40 is not provided anymore during operation of the hydraulic valve 1. High load peaks can also lead to an unintentional opening of the known clip filter 40.

Figure 3:
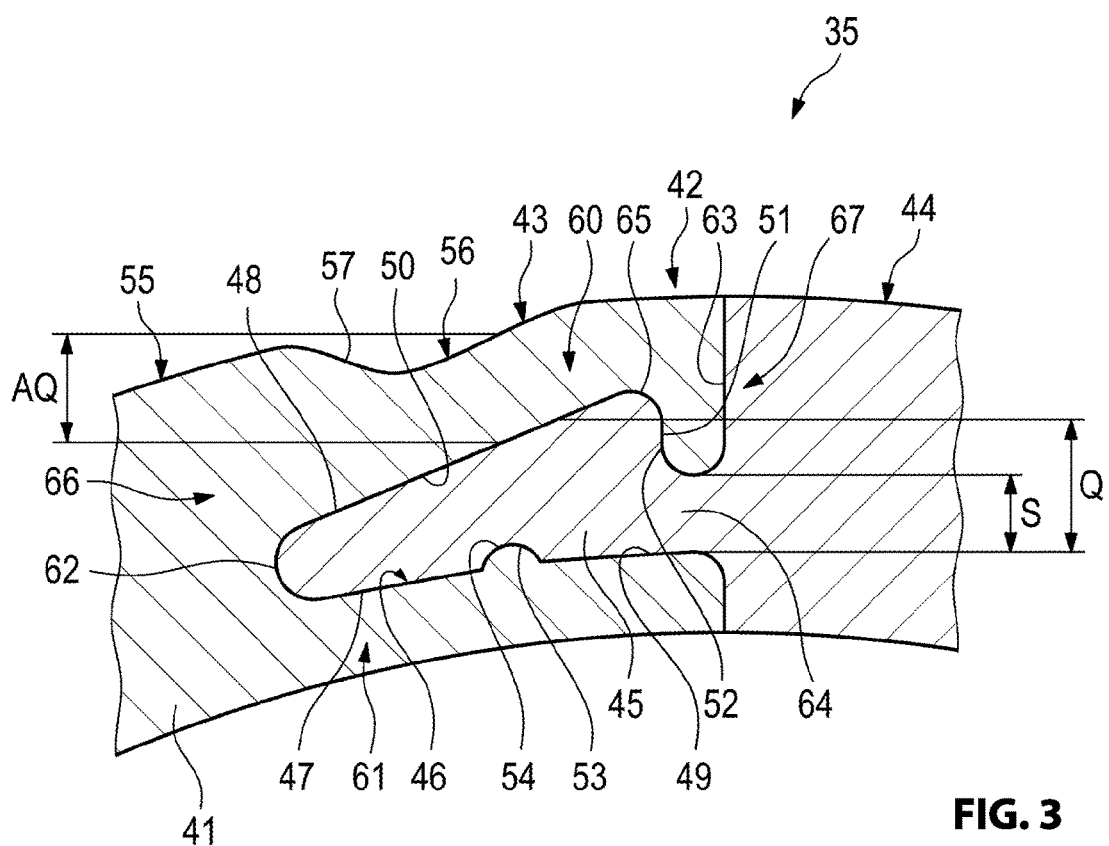
FIG. 3 illustrates and enlarged detail of a closed clip filter according to the invention.

The clip filter 35 according to the invention which is illustrated in FIG. 3 in a highly enlarged detail includes filter elements that are not illustrated in more detail and received in a carrier frame 41 wherein the carrier frame 41 is configured annular. A clip filter lock 42 of the clip filter 35 which is used for locking the clip filter 35 includes ends or end portions 43, 44 of the carrier frame 41 that can be brought into engagement with each other. It is evident that the second end 44 includes a lug shaped clip element 45 which engages a complementary recess 46 of the first end 43 for closing the carrier frame 41. In order to prevent unintentional opening of the clip filter 35 the clip filter lock 42 according to the invention is provided an opening force is optimized.

A clip filter lock 42 with optimized opening force is a clip filter lock 42 which has small mounting or closing forces while still having high opening forces.

This means put differently that the opening forces for opening the clip filter lock 42 are much higher than the closing forces which are required for closing the flip filter lock 42. This means that the clip filter lock 42 on the one hand side has to have a certain amount of flexibility during the closing process whereas it has to be configured to impede a possible opening process. This is achieved by an optimized longitudinal extension of the clip filter lock 42 in the circumferential direction. Put differently this means that a male portion of the clip filter lock 42 which is configured as a lug shaped clip filter element 45 and a female portion of the clip filter lock 42 which is configured as a recess 46 have to be adapted with respect to their extensions in the radial direction and the circumferential direction to forces possibly impacting the clip filter 35.

The lug shaped clip element 45 is essentially configured wedge shaped with a bottom side 47 configured essentially parallel to the opening or closing direction and a top side 48, wherein the a length of the clip element 45 and of the recess 46 in the circumferential direction is configured so that the clip filter lock 42 has a certain amount of flexibility. The recess 46 includes surfaces 49, 50 that are configured complementary to the bottom side 47 and the top side 48.

Furthermore the clip element 45 and the recess 46 includes surface portions 51, 52 that are respectively configured orthogonal to the opening or closing direction, this means to the circumferential direction, which surface portions put up a strong resistance through circumferentially acting forces against opening. Thus, circumferential forces required for opening are substantially increased.

As evident from FIG. 3 the orthogonal surface portions 51, 52 adjoin a top side 48 or the surface 50. The top side 48 is configured inclined in circumferential direction relative to the bottom side 47, so that the clip element 45 has a cross section Q that is variable in the circumferential direction which cross section increases starting from an element tip 62 in a direction towards the first surface portion 51.

The recess 46 is thus configured so that it envelops the lug shaped clip element 45 in the interlocked condition completely in the circumferential direction and in the radial direction at one end at its element tip 62 completely and at an outer end that is oriented away from the element tip 62 to a major extent.

The clip element 45 is connected by a bar 64 with the end 44 of the carrier frame 41.

The bar 64 in the illustrated embodiment includes a bar cross section S which corresponds to a half cross section Q of the clip element 45 at the first surface portion 51 minus a radius 65 at the first surface portion 51. The bar cross section S has to be configured as a function of forces impacting the clip filter 35 during operation of the hydraulic valve 1 or resulting upon the bar 64 so that circumferential forces in particular during closing and opening are received without a failure, this means tearing or fracturing of the bar. The radius 65 reduces the closing forces to be imparted.

The surface 49 of the recess 46 associated with the bottom side 47 of the clip element 45 includes a bead 53 wherein the bottom side 47 of the clip element 45 includes a complementary recess 54. The bead 53 moves the orthogonal surface portion 51 of the clip element 45 under opening circumferential forces against the orthogonal surface portion 52 of the recess 46 so that the opening forces are increased additionally and opening the clip filter 35 is even made more difficult.

The carrier frame 41 includes a first outer arm 60 in a circumferential direction in a portion of the recess 46 at an outside 55 of the carrier frame 51 and a second outer arm 61 opposite to the first outer arm 60 wherein the recess 46 is configured between the first outer arm and the second outer arm. The clip element 45 is received in its entirety in the recess 46 between the first outer arm 60 and the second outer arm 61.

It is furthermore evident that the outside 55 of the carrier frame 51 includes a cross section contraction 56 in the portion of the recess 46, this means in a portion of the upper side 48, wherein the cross section reduction is provided adapted to a form of the clip element 45 or of the recess 46. This means put differently that the first outer arm 60 includes a cross section reduction of its arm cross section AQ starting at a first arm end 66 oriented towards the element tip 62 and running to a second arm end 67 to be arranged opposite to a side surface 63 of the end 44. The arm cross section AQ is substantially adapted to an inclination of the top side 48 of the clip element 45 in a portion covering the top side 48 and configured constant in the radial direction.

Thus, the cross section reduction 56 helps to increase flexibility and facilitates an elastic radially outward deformation when closing the clip filter 35. Thus, the first outer arm 60 is configured to change position during the closing process.

In the portion of the bottom side 47 the cross section of the carrier frame 41 is optimized so that this portion is provided less flexible to minimize a possibility of a radial contact at the installation space and the associated higher closing forces or loads. The cross section reduction 56 transitions into a radius 57 in order to obtain an optimum compromise between a small load during closing and flexibility.

The clip filter lock 42 facilitates simpler assembly through smaller closing forces however prevents unintentional opening of the clip filter 35 under high load peaks or during an initial filling, thus the clip filter 35 according to the invention protects the hydraulic valve 1 against contamination reliably.

The filter elements can be provided for example in one piece as a sheet metal band with filter openings and can be provided integrally injection molded with the carrier frame 41 which is advantageously made from a plastic material.

What is claimed is:

1. A clip filter for a hydraulic valve, the clip filter comprising:
   a carrier frame; and
   filter elements received in the carrier frame,
   wherein the carrier frame is configured annular and includes a clip filter lock,
   wherein a first end of the carrier frame and a second end of the carrier frame are engageable with each other for closing the clip filter,
   wherein the second end of the carrier frame includes a lug shaped clip element and the first end of the carrier frame includes a recess that is complementary to the lug shaped clip element,
   wherein the lug shaped clip element is configured wedge shaped with a bottom side and a top side that is oriented away from the bottom side,
   wherein the recess is configured complementary to the lug shaped clip element and includes a first surface that is complementary to the top side and a second surface that is complementary to the bottom side,
   wherein the lug shaped clip element and the recess respectively include at least one surface portion that is configured orthogonal to an opening direction or a closing direction of the clip filter lock,
   wherein the recess includes the second surface arranged opposite to a bottom side of the clip element,
   wherein the second surface includes a bead and the bottom side of the clip element includes a second recess that is complementary to the bead, and
   wherein the bead and the second recess are arranged deeper inside the recess than the at least one surface portion of the lug shaped clip element that is orthogonal to the opening and closing direction of the clip filter lock and that locks the lug shaped clip element in the recess when the lug shaped clip element is inserted into the recess.

2. The clip filter according to claim 1, wherein an outer arm configured at an outside of the carrier frame is configured to change position during a closing process.

3. The clip filter according to claim 2, wherein the outer arm has a reduced cross section in a portion adjacent to the recess.

4. The clip filter according to claim 3, wherein the outer arm includes a radius at a side of the outer arm that is oriented away from the clip element.

5. The clip filter according to claim 1,
   wherein the filter elements are configured in one piece as a sheet metal band with filter openings, and
   wherein the sheet metal band is provided integrally injection molded with the carrier frame.

6. A hydraulic valve, comprising:
   a valve bushing;
   a valve piston that is axially moveable in the valve bushing along a longitudinal axis of the valve bushing;
   a supply connection for supplying a hydraulic fluid;
   at least one operating connection;
   at least one tank connection for draining the hydraulic fluid,
   wherein the valve piston is movable by an electromagnetic actuator of the hydraulic valve, and
   wherein the supply connection or the at least one operating connection is covered by a clip filter according to claim 1.

7. The clip filter according to claim 1, wherein an outer arm configured at an outside of the carrier frame is configured to change position during a closing process.

8. The clip filter according to claim 7, wherein the outer arm has a reduced cross section in a portion adjacent to the recess.

9. The clip filter according to claim 8, wherein the outer arm includes a radius at a side of the outer arm that is oriented away from the clip element.

10. The clip filter according to claim 1,
    wherein the filter elements are configured in one piece as a sheet metal band with filter openings, and
    wherein the sheet metal band is provided integrally injection molded with the carrier frame.

11. A hydraulic valve, comprising:
    a valve bushing;
    a valve piston that is axially moveable in the valve bushing along a longitudinal axis of the valve bushing;
    a supply connection for supplying a hydraulic fluid;
    at least one operating connection;
    at least one tank connection for draining the hydraulic fluid,
    wherein the valve piston is movable by an electromagnetic actuator of the hydraulic valve, and
    wherein the supply connection or the at least one operating connection is covered by a clip filter according to claim 1.

* * * * *